(12) United States Patent
Eriksson et al.

(10) Patent No.: US 12,110,021 B2
(45) Date of Patent: Oct. 8, 2024

(54) CONTROL DEVICE AND A METHOD FOR CONTROLLING VEHICLE SPEED

(71) Applicant: VOLVO TRUCK CORPORATION, Gothenburg (SE)

(72) Inventors: Anders Eriksson, Torslanda (SE); Jan Hjelmgren, Borås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 250 days.

(21) Appl. No.: 17/773,922

(22) PCT Filed: Nov. 6, 2019

(86) PCT No.: PCT/EP2019/080323
§ 371 (c)(1),
(2) Date: May 3, 2022

(87) PCT Pub. No.: WO2021/089134
PCT Pub. Date: May 14, 2021

(65) Prior Publication Data
US 2022/0340132 A1    Oct. 27, 2022

(51) Int. Cl.
*B60W 30/14* (2006.01)
*B60W 40/00* (2006.01)
(Continued)

(52) U.S. Cl.
CPC ........ *B60W 30/146* (2013.01); *B60W 40/072* (2013.01); *B60W 50/0098* (2013.01);
(Continued)

(58) Field of Classification Search
CPC ............. B60W 50/10; B60W 2556/10; B60W 2556/40; B60W 2720/103; B60W 30/143;
(Continued)

(56) References Cited

U.S. PATENT DOCUMENTS 6,161,072 A     12/2000  Clapper
7,346,438 B2 *   3/2008  Berglund ................ F16H 61/16
                                                   701/23
(Continued)

FOREIGN PATENT DOCUMENTS

DE     10225892 A1    1/2004
DE     10355220 A1    6/2005
(Continued)

OTHER PUBLICATIONS

International Search Report and Written Opinion for International Patent Application No. PCT/EP2019/080323, mailed Aug. 11, 2020, 9 pages.
(Continued)

*Primary Examiner* — Tyler J Lee
(74) *Attorney, Agent, or Firm* — Sage Patent Group

(57) ABSTRACT

A method and a control device for controlling speed of a vehicle having an automatic cruise control system configured to automatically control speed based on a set speed and to automatically reduce the speed to a predetermined safe speed below the set speed as it is detected that the vehicle approaches a road section of a predetermined type such as a curve. The method includes while automatically controlling the speed towards the predetermined safe speed as the vehicle approaches the road section of the predetermined type, receiving a request from a driver of the vehicle to control speed to a temporary speed different from the predetermined safe speed and the set speed. The method includes in response to said request, controlling the speed to the temporary speed. The method includes at an end of the road section of the predetermined type, automatically controlling the speed based on the set speed.

20 Claims, 2 Drawing Sheets

(51) Int. Cl.
 B60W 40/072 (2012.01)
 B60W 50/00 (2006.01)
 B60W 50/10 (2012.01)
(52) U.S. Cl.
 CPC ..... *B60W 50/10* (2013.01); *B60W 2050/0083* (2013.01); *B60W 2300/125* (2013.01); *B60W 2540/10* (2013.01); *B60W 2540/12* (2013.01); *B60W 2552/30* (2020.02); *B60W 2556/10* (2020.02)
(58) Field of Classification Search
 CPC ............ B60W 30/146; B60W 40/072; B60W 50/0098
 See application file for complete search history.

(56) References Cited

U.S. PATENT DOCUMENTS

| | | | | |
|---|---|---|---|---|
| 7,400,963 | B2 * | 7/2008 | Lee | B60W 10/184 701/72 |
| 7,684,921 | B2 * | 3/2010 | Kojima | G08G 1/165 180/170 |
| 8,204,666 | B2 * | 6/2012 | Takeuchi | B60K 28/06 701/70 |
| 8,996,273 | B2 * | 3/2015 | Lee | G01C 21/20 701/96 |
| 9,827,986 | B2 * | 11/2017 | Pilutti | B60K 35/00 |
| 10,363,929 | B2 * | 7/2019 | Yamakado | B60W 40/13 |
| 10,513,262 | B2 * | 12/2019 | Schuberth | B60W 30/18 |
| 2003/0033069 | A1 * | 2/2003 | Bauer | B60W 10/06 701/65 |
| 2009/0300067 | A1 * | 12/2009 | Denaro | B60W 40/072 |
| 2016/0185388 | A1 * | 6/2016 | Sim | G06V 20/58 701/41 |
| 2017/0291604 | A1 | 10/2017 | Mukkala, II et al. | |
| 2017/0297576 | A1 * | 10/2017 | Halder | G01C 21/3415 |
| 2017/0327113 | A1 * | 11/2017 | Yamakado | B60W 50/0097 |
| 2019/0232970 | A1 | 8/2019 | Watanabe et al. | |

FOREIGN PATENT DOCUMENTS

| | | |
|---|---|---|
| DE | 102013209064 A1 | 11/2014 |
| EP | 2885186 A1 | 6/2015 |

OTHER PUBLICATIONS

International Preliminary Report on Patentability for International Patent Application No. PCT/EP2019/080323, mailed Feb. 24, 2022, 7 pages.

* cited by examiner

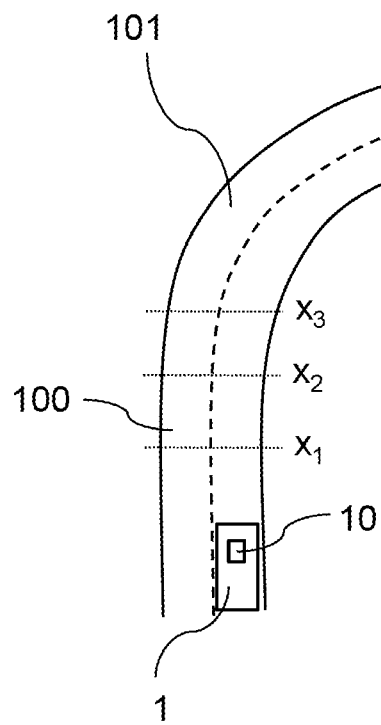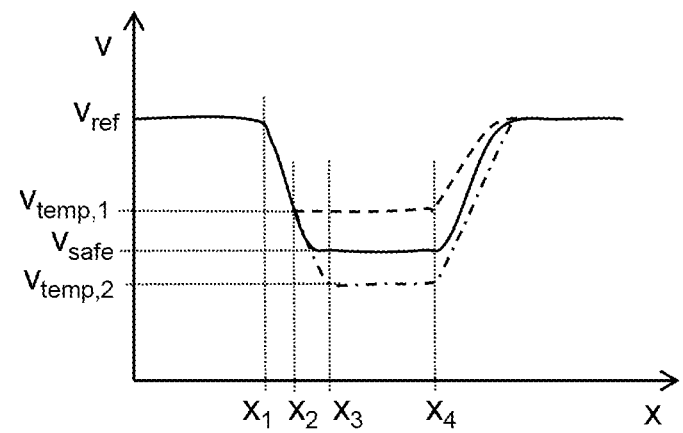
Fig. 3a    Fig. 3b
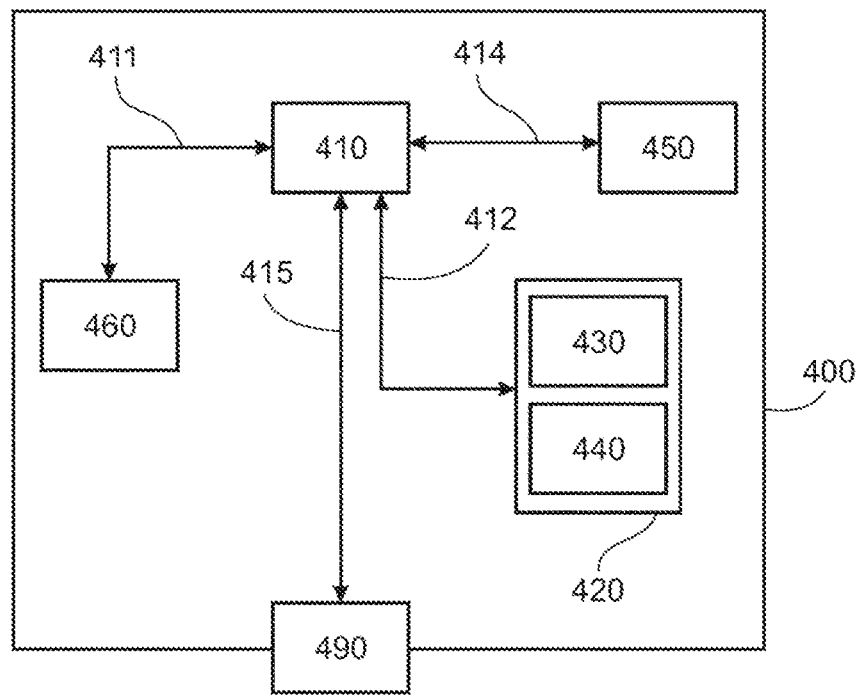
Fig. 4

CONTROL DEVICE AND A METHOD FOR CONTROLLING VEHICLE SPEED

CROSS REFERENCE TO RELATED APPLICATIONS

This application is a 35 U.S.C. § 371 national stage application of PCT International Application No. PCT/EP2019/080323 filed on Nov. 6, 2019, the disclosure and content of which is incorporated by reference herein in its entirety.

TECHNICAL FIELD

The invention relates to a device/method for controlling a vehicle speed of a vehicle. The invention also relates to a vehicle, a computer program, and a computer readable medium.

The invention can be applied in heavy-duty vehicles, such as trucks, buses and construction equipment. Although the invention will be described with respect to a truck, the invention is not restricted to this particular vehicle, but may also be used in other vehicles such as light-weight trucks, articulated haulers, wheel loaders, and passenger cars.

BACKGROUND

Driver assistance systems including intelligent cruise controls are important tools for lowering fuel consumption and improving safety during driving of heavy-duty vehicles. An intelligent cruise control allows a driver of the vehicle to set a desired speed, usually referred to as a set speed of the cruise control, and controls the vehicle speed to a reference speed based on this set speed. The reference speed may be allowed to differ within certain limits from the set speed, based on e.g. road topography and traffic conditions. Map data in combination with positioning information may be used for this purpose, as well as sensors provided on the vehicle. On one hand, such cruise controls are able to adjust the actual vehicle speed to the topography of the road, thereby allowing the vehicle to build momentum ahead of a hill and to take advantage of kinetic energy gained during downhill travel such that the total fuel consumption may be reduced. On the other hand, when travelling behind another vehicle, such a cruise control is able to automatically adapt a distance or time gap to the vehicle ahead to a minimum safety gap, thereby improving driving safety. A local environment perception sensor, such as a camera, a radar or a lidar (Light Detection and Ranging), may for example be used for determining the inter-vehicle distance.

Intelligent cruise controls may also be configured to lower the vehicle speed prior to upcoming obstacles or road sections of different types, such as prior to curves, traffic signs, intersections, roundabouts, etc. In this case, the cruise control ensures that the vehicle travels at a safe speed through the road section or past the obstacle.

US2013138319 discloses such a driver assist system, which automatically adjusts the vehicle speed when traversing a curve by taking curve data into account.

However, in order to ensure a safe operation, the safe speed set by the cruise control may usually be relatively low. There is therefore a risk that the driver considers the safe speed to be too low, or otherwise unsuitable, and disables the cruise control in order to be able to traverse the road section at a speed that he/she controls. In particular, this may be the case if the driver frequently travels the same road and knows how the vehicle is likely to behave at the various road sections. As a result of disabling the cruise control, the total fuel consumption of the vehicle may increase.

SUMMARY

A primary object of the invention is to provide a control device and a method for controlling a vehicle speed of a vehicle, which control device and method offer an increased sense of control to a driver of the vehicle. In particular, it is an object to provide such a control device and method which increase the probability that a driver of the vehicle will keep an automatic cruise control of the vehicle activated also when traversing road sections at which the cruise control normally reduces the vehicle speed to a predetermined safe speed. For example, it is an object to improve the likelihood that the driver will keep the cruise control activated when traversing curves.

According to a first aspect of the invention, at least the primary object is achieved by a control device for controlling a vehicle speed of a vehicle according to claim 1. The control device is configured to automatically control the vehicle speed based on a set speed and to automatically reduce the vehicle speed to a predetermined safe speed below the set speed as it is detected that the vehicle approaches a road section of a predetermined type. The control device is configured to:
  while automatically controlling the vehicle speed towards the predetermined safe speed as the vehicle approaches the road section of the predetermined type, receive a request from a driver of the vehicle to control the vehicle speed to a temporary vehicle speed different from the predetermined safe speed and the set speed,
  in response to said request, control the vehicle speed to the temporary vehicle speed,
  at an end of the road section of the predetermined type, automatically control the vehicle speed based on the set speed.

The proposed control device, which may form part of an automatic cruise control system of the vehicle or which may be a separate electronic control device, allows the driver to temporarily, while traversing the road section of the predetermined type, control the vehicle speed to a selected temporary vehicle speed without having to disable the control device. The driver is thereby offered improved possibilities of controlling the vehicle speed while driving with an active cruise control, taking e.g. personal preferences or current road conditions into account. The risk that the driver disables the cruise control is thereby reduced. This is beneficial, since driving with an active cruise control is associated with advantages such as reduced fuel consumption and automatic adaptation of a distance between the present vehicle and a lead vehicle, travelling ahead of the present vehicle.

Detecting that the vehicle approaches a road section of the predetermined type may be carried out based on map data in combination with positioning information, such as global positioning system (GPS) information, and/or based on sensor data from a local environment perception sensor such as a camera, a radar or a lidar mounted on the vehicle. The road section of the predetermined type may in particular be a curve, but it may also be a roundabout, an intersection, or a road section preceded by a traffic sign, such as a speed limit sign. A curve may herein be defined as a road section having at least a minimum road curvature.

The set speed based on which the control device controls the vehicle speed may be a speed set by the driver of the vehicle. The control device may however be configured to control the vehicle speed towards a reference speed set in dependence on the set speed and on e.g. a road topography, a distance to a lead vehicle, and/or speed limitations, which reference speed may be allowed to differ from the set speed within predefined limits. Thus, the control device may be able to control the vehicle speed towards the set speed, or towards the reference speed.

The predetermined safe speed may be a speed determined in relation to the set speed and/or based on e.g. road curvature of the road section of the predetermined type, and/or a speed limit of the road section.

It may be determined that the end of the road section of the predetermined type is reached as a predetermined condition is fulfilled. For example, if the road section of the predetermined type is a curve, it may be determined that the end of the curve is reached when the road curvature is below a predetermined value. As soon as it is determined that the end of the road section of the predetermined type is reached, the control device again controls the vehicle speed based on the set speed. The control device may thus either control the vehicle speed towards the set speed, or towards a reference speed set based on the set speed as explained above.

The control device may comprise at least one communication interface for receiving requests from the driver and for receiving data communicated from other units within the vehicle, such as from various sensors, systems and control units, in particular with one or more electronic control units (ECUs) controlling electrical systems or subsystems in the vehicle, such as an engine control unit and a transmission control unit. The control device may be configured to communicate wirelessly or via a hardwire system.

Optionally, the control device may be configured to identify at least a first type of request from the driver and in response thereto set the temporary vehicle speed to a current vehicle speed of the vehicle at a time of receiving the first type of request. This is useful when the predetermined safe speed is set to a speed which is slow enough to be safe regardless of road conditions, traffic, etc., and the driver judges that the road and traffic conditions are such that the road section of the predetermined type may be traversed at a higher speed. By generating the first type of request when he/she considers that the vehicle speed is sufficiently slow to be able to safely travel through the upcoming road section of the predetermined type, which may for example be a curve, the driver is thus able to set a temporary vehicle speed which is higher than the predetermined safe speed.

The control device may for example be configured to identify the request from the driver as the first type of request when said request is generated by actuating a first control means. The first control means may for example be a button, a touch-panel or a pedal accessible to the driver.

Optionally, the control device may further be configured to identify a second type of request from the driver and in response thereto reduce the vehicle speed below the predetermined safe speed. The control device may be configured to identify the request from the driver as the second type of request when said request is generated by actuating a second control means. The second control means may for example be a button, a touch-panel or a pedal accessible to the driver.

This is useful when the driver wants to drive at a speed which is lower than the predetermined safe speed, e.g. when the road is slippery, when the roadway is damaged, or when a road banking is such that a lower speed is desirable.

Optionally, the control device may be configured to reduce the vehicle speed until a predetermined end condition is fulfilled.

Optionally, said predetermined end condition may be considered to be fulfilled when the first type of request is received, or when it is determined that the vehicle has reached the end of the road section of the predetermined type. That the vehicle has reached the end of the predetermined road section may be determined from map data in combination with positioning information. Alternatively, it may be determined from sensor data, e.g. from steering wheel angle or from a difference in rotational speed of left- and right-hand wheels of the vehicle when the road section of the predetermined type is a curve.

Optionally, the control device may be configured to identify the request from the driver as the first type of request when said request is generated by actuating an accelerator pedal of the vehicle, such as by depressing, or depressing and subsequently releasing, the accelerator pedal. An intuitive and straight-forward way of setting a temporary vehicle speed to be used for traversing the road section of the predetermined type, which temporary speed is higher than the predetermined safe speed, is thereby provided. One or more condition(s) may be set for considering a request to be generated by actuating the accelerator pedal, for example a condition relating to an amount by which the accelerator pedal is depressed, and/or a condition relating to a duration of a depression of the accelerator pedal. For example, a condition may be set that the accelerator pedal has to be depressed by at least a predetermined minimum amount, and/or that a duration of the depression has to be within a certain time interval or below a certain threshold, in order to generate the first type of request. The first type of request may e.g. be generated when the driver releases the accelerator pedal after a depression fulfilling the condition.

Optionally, the control device may be configured to identify the request from the driver as the second type of request when said request is generated by actuating a brake pedal of the vehicle, such as by depressing, or depressing and subsequently releasing, the brake pedal. This offers an intuitive and straight-forward way of setting a temporary vehicle speed which is lower than the predetermined safe speed. One or more condition(s) may be set for considering a request to be generated by actuating the brake pedal, for example a condition relating to an amount by which the brake pedal is depressed, and/or a condition relating to a duration of a depression of the brake pedal. For example, a condition may be set that the brake pedal has to be depressed by at least a predetermined minimum amount, and/or that a duration of the depression has to be within a certain time interval or below a certain threshold, in order to generate the second type of request. The second type of request may e.g. be generated when the driver releases the brake pedal after a depression fulfilling the condition.

Optionally, the control device may be configured to store data relating to the request from the driver. Such data may be stored together with positioning data, thus allowing information regarding how the driver has acted when traversing a particular road section to be used for evaluation and adaptation purposes. Other data that are available, such as road condition data and/or weather data and/or vehicle configuration data including e.g. vehicle mass, may also be stored and used for evaluation and adaptation purposes.

Optionally, the control device may be configured to use the stored data for adaptation of the predetermined safe speed of the vehicle. This increases driver comfort since less intervention is needed by the driver, in particular when the same road is frequently travelled. The stored data may, apart from the data relating to the request from the driver, also include positioning data and/or the other data mentioned above.

Optionally, the control device may be further configured to:
   detect that the vehicle approaches a previously travelled road section of the predetermined type for which data relating to at least one request from the driver has been stored,
   in response to said detection, automatically control the vehicle speed to a stored temporary vehicle speed.

This is useful when the same road is travelled frequently at similar conditions.

According to a second aspect of the invention, at least the primary object is achieved by a method for controlling a vehicle speed of a vehicle having an automatic cruise control system configured to automatically control the vehicle speed based on a set speed and to automatically reduce the vehicle speed to a predetermined safe speed below the set speed as it is detected that the vehicle approaches a road section of a predetermined type according to the independent method claim.

The method according to the second aspect comprises:
   while automatically controlling the vehicle speed towards the predetermined safe speed as the vehicle approaches the road section of the predetermined type, receiving a request from a driver of the vehicle to control the vehicle speed to a temporary vehicle speed different from the predetermined safe speed and the set speed,
   in response to said request, controlling the vehicle speed to the temporary vehicle speed,
   at an end of the road section of the predetermined type, automatically controlling the vehicle speed based on the set speed.

The method may be carried out by an automatic cruise control system of the vehicle. However, it may also be carried out at least in part by a separate control device provided in addition to an automatic cruise control system. Advantages and advantageous features of the method according to the second aspect are largely analogous to advantages and advantageous features of the control device according to the first aspect.

Optionally, the method may comprise identifying at least a first type of request from the driver, and in response thereto setting the temporary vehicle speed to a current vehicle speed of the vehicle at a time of receiving the first type of request.

Optionally, the method may further comprise identifying a second type of request from the driver and in response thereto reducing the vehicle speed below the predetermined safe speed.

Optionally, the method may further comprise reducing the vehicle speed until a predetermined end condition is fulfilled.

Optionally, said predetermined end condition is considered to be fulfilled when the first type of request is received, or when it is determined that the vehicle has reached the end of the road section of the predetermined type.

Optionally, the method may comprise identifying the request from the driver as the first type of request when said request is generated by actuating an accelerator pedal of the vehicle.

Optionally, the method may comprise identifying the request from the driver as the second type of request when said request is generated by actuating a brake pedal of the vehicle.

Optionally, the method may further comprise:
   storing data relating to said request from the driver.

Optionally, the method may further comprise:
   using the stored data for adaptation of the predetermined safe speed of the vehicle.

Optionally, the method may further comprise:
   detecting that the vehicle approaches a previously travelled road section of the predetermined type for which data relating to at least one request from the driver has been stored,
   in response to said detection, automatically controlling the vehicle speed to a stored temporary vehicle speed.

According to a third aspect of the invention, a computer program comprising program code means for performing the steps of the method according to the second aspect when said computer program is run on a computer is provided.

According to a fourth aspect of the invention, a computer readable medium carrying a computer program comprising program code means for performing the steps of the method according to the second aspect when said computer program is run on a computer is provided.

According to a fifth aspect of the invention, a vehicle comprising a control device according to the first aspect of the invention is provided. Advantages and advantageous features of the vehicle according to the fifth aspect are largely analogous to advantages and advantageous features of the control device according to the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:
FIG. 3b shows vehicle speed as a function of vehicle position on the road,
and
   FIG. 4 shows a control device according to an embodiment of the invention.

Figure 1:
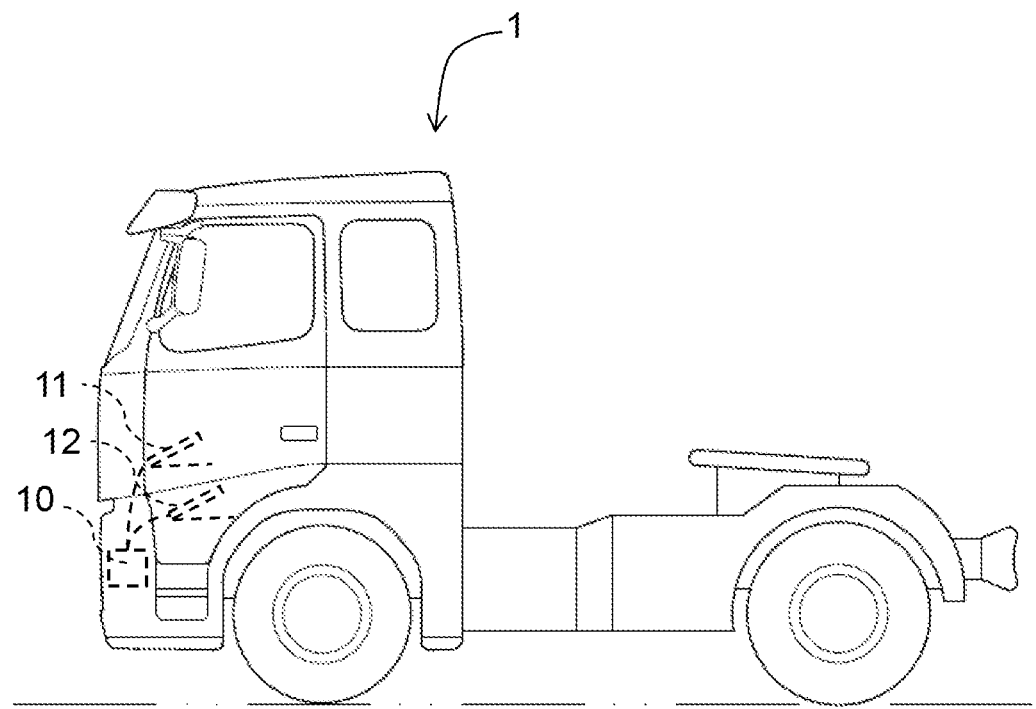
FIG. 1 shows a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 1 in the form of a heavy-duty truck is schematically shown in FIG. 1. The vehicle 1 includes a control device 10 for controlling a vehicle speed of a vehicle 1. In the shown embodiment, the control device 10 forms part of an automatic cruise control system configured to automatically control the vehicle speed v based on a set speed $v_{set}$, which may be set by a driver of the vehicle 1 or which may be automatically set based on e.g. a speed limitation of a road on which the vehicle 1 travels. The vehicle 1 comprises an accelerator pedal 11 and a brake pedal 12, by means of which the driver may manually control the vehicle speed, and by means of which the driver may furthermore generate requests to the control device 10.

The vehicle 1 is furthermore equipped with various types of sensors (not shown), including one or more of: at least one wheel speed sensor for sensing rotational speed of a wheel of the vehicle, a steering angle sensor, an electronic accelerator pedal sensor, a brake pedal sensor, a local environment perception sensor such as a camera, a radar or a lidar, an inclination sensor for indicating vehicle inclination, an accelerometer, a temperature sensor, and sensors for sensing various engine parameters. The vehicle may also comprise a navigation system for determining a position of the vehicle and predict characteristics of a road on which the vehicle is travelling, e.g. based on map data in combination with positioning information, such as global positioning system (GPS) information.

The automatic cruise control system may be configured to control the vehicle speed based on one hand on the set speed $v_{set}$, and on the other hand on e.g. road topography and surrounding traffic, using e.g. data received from the navigation system and/or from the sensors of the vehicle, such as from local environment perception sensors. Thus, the automatic cruise control system may be a cruise control system which automatically adapts the vehicle speed to keep a minimum safety distance to a vehicle travelling ahead of the vehicle, and which adjusts the vehicle speed to improve the energy efficiency of the vehicle 1 during driving.

Figure 2:
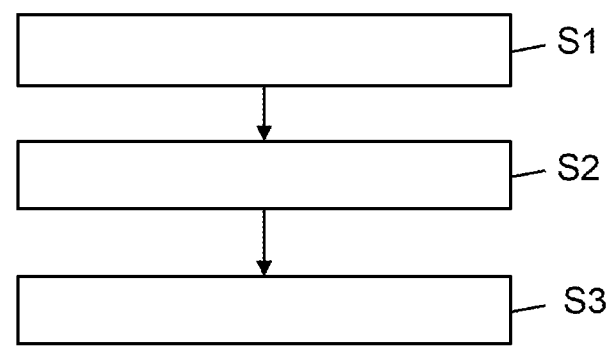
FIG. 2 is a flow chart illustrating a method according to an embodiment of the invention,
   FIG. 3a schematically shows a road on which a vehicle according to an embodiment of the invention is travelling.

A method according to an embodiment of the invention is illustrated in FIG. 2. The method may be carried out by the control device 10, forming part of an automatic cruise control system, or alternatively by a control device which is separate from an automatic cruise control system of the vehicle 1.

As the method is initiated, the vehicle 1 comprising the control device 10 is travelling on a road 100 as illustrated in FIG. 3a, and is approaching a road section 101 of a predetermined type. In this case, the road section 101 is a curve 101, but other predetermined types of road sections may e.g. be intersections, roundabouts, road sections following traffic signs, etc., for which it is normally desired to lower the vehicle speed v of the vehicle 1. The vehicle speed v is initially controlled by the control device 10 based on a set speed $v_{set}$. As it is detected that the curve 101 is approaching, for example using a navigation system of the vehicle 1 or using a local environment perception sensor, the control device 10 starts to lower the vehicle speed v from the set speed $v_{set}$ towards a predetermined safe speed $v_{safe}$.

In a first step S1 of the method according to an embodiment of the invention, carried out while lowering the vehicle speed towards the safe speed $v_{safe}$, a request from the driver of the vehicle 1 to control the vehicle speed to a temporary vehicle speed $v_{temp}$ different from the predetermined safe speed $v_{safe}$ and the set speed $v_{set}$ is received in the control device 10.

In a second step S2, the control device 10 controls the vehicle speed v to the temporary vehicle speed $v_{temp}$ requested by the driver. The second step S2 is carried out in response to receipt of the request in step S1. The vehicle speed v may be controlled to the temporary vehicle speed $v_{temp}$ throughout the road section 101 of the predetermined type.

In a third step S3, carried out at an end of the road section 101 of the predetermined type, the control device 10 again automatically controls the vehicle speed v based on the set speed $v_{set}$. The third step S3 may be carried out as it is detected that the vehicle 1 is at an end of the road section 101 of the predetermined type, for example using a navigation system of the vehicle or using e.g. one or more local environment perception sensors of the vehicle 1, or using a steering wheel angle sensor of the vehicle 1, or using wheel speed sensors of left- and right-hand wheels of the vehicle 1.

In a first exemplary driving scenario, the vehicle 1 is driving along the road 100 as illustrated in FIG. 3a. Furthermore, FIG. 3b schematically illustrates the vehicle speed v of the vehicle 1 as a function of vehicle position x within the curve 101. Herein, the solid line shows how the vehicle speed would be controlled in the curve 101 without intervention by the driver, while the dashed line shows how the vehicle speed may be controlled according to the method illustrated in FIG. 2 upon request of the driver. The dash-dotted line shows the vehicle speed in accordance with a second exemplary driving scenario, also described in the following.

In the first exemplary driving scenario, the control device 10 of the vehicle 1 controls the vehicle speed to a reference speed $v_{ref}$, determined based on the set speed $v_{set}$ in combination with map data and geographic positioning information received from a navigation system of the vehicle 1. As the navigation system at a point $x_1$ detects that the vehicle 1 approaches the curve 101, the control device 10 starts to lower the vehicle speed towards the predetermined safe speed $v_{safe}$. During the deceleration, at the point $x_2$, the driver considers that the vehicle 1 has reached a vehicle speed which is suitable for traversing the curve 101. He/she then briefly depresses the accelerator pedal 11, i.e. depresses the accelerator pedal for a short amount of time. The brief depression of the accelerator pedal 11 triggers a first type of request received in the control device 10 in the step S1. In response to the first type of request, the control device 10 sets a temporary vehicle speed $v_{temp,1}$ to the current vehicle speed v at the point $x_2$, and, in the step S2, controls the vehicle speed to this temporary vehicle speed $v_{temp,1}$ while traversing the curve 101. When the navigation system detects, at a point $x_4$, that the vehicle 1 reaches an end of the curve 101, the control device 10 in step S3 automatically controls the vehicle speed back to the reference speed $v_{ref}$, determined based on the set speed $v_{set}$ as described above. Step S3 is carried out without interaction from the driver, thus the driver does not need to signal that he/she wishes the vehicle speed to be raised as the vehicle 1 exits the curve 101.

In the second exemplary driving scenario, the vehicle 1 approaches the curve 101 and the control device 10 consequently starts to lower the vehicle speed towards the predetermined safe speed $v_{safe}$. However, the driver considers that the road is slippery, and during the deceleration, at the point $x_2$, he/she therefore briefly depresses the brake pedal 12 of the vehicle 1. The brief depression of the brake pedal 12 triggers a second type of request received in the control device 10 in the step S1. In response to the second type of request, the control device 10 reduces the vehicle speed below the predetermined safe speed $v_{safe}$ until a predetermined condition is fulfilled. In this case, when the driver at a point $x_3$ considers that the vehicle speed is sufficiently low for safely traversing the curve 101, he/she briefly depresses the accelerator pedal 11, thus triggering the first type of request such that the control device sets the current vehicle speed as a temporary vehicle speed $v_{temp,2}$ for traversing the curve 101. The vehicle 1 thereafter travels through the curve 101 as described above in connection with the first exemplary driving scenario.

In both of the exemplary driving scenarios, data relating to the requests from the driver may be stored in the control device 10 together with positioning information, i.e. data relating to the geographic position of the vehicle upon receiving the requests. The stored data may be used to adapt the predetermined safe speed ($v_{safe}$) of the vehicle 1, such that, if the vehicle and/or the driver travel(s) the same road 100 again, the vehicle speed for traversing the curve 101 is automatically controlled to a value which is closer to a speed that has previously been requested by the driver in that particular curve 101 than the predetermined safe speed $v_{safe}$ set for traversing the curve 101 the first time.

As it is detected that the vehicle 1 approaches a previously travelled curve 101, for which data relating to at least one request from the driver has been stored, the control device 10 may for example automatically control the vehicle speed to a stored temporary vehicle speed. Road and/or weather conditions may also be taken into account, for example to select a suitable stored temporary vehicle speed if the curve 101 has been travelled many times.

The control functionality of the example embodiments may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

FIG. 4 shows a control device 400 configured for carrying out the method according to embodiments of the invention, comprising a non-volatile memory 420, a data-processing unit 410 and a read and write memory 460. The memory 420 has a first memory part 430, in which a computer program for controlling the control device 400 is stored. The computer program in the memory part 430 for controlling the control device 400 can be an operating system.

The control device 400 can be comprised in, for example, the control device 10 described above, or in another control unit of the vehicle 1. The data-processing unit 410 can comprise, for example, a microcomputer. The memory 420 also has a second memory part 440, in which a program for controlling the vehicle speed according to the invention is stored. In an alternative embodiment, the program for controlling the vehicle speed is stored in a separate non-volatile storage medium 450 for data, such as, for example, a CD or an exchangeable semiconductor memory. The program can be stored in an executable form or in a compressed state. When it is stated below that the data-processing unit 410 runs a specific function, it should be clear that the data-processing unit 410 is running a specific part of the program stored in the memory 420 or a specific part of the program stored in the non-volatile storage medium 450. The data-processing unit 410 is tailored for communication with the non-volatile storage medium 450 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

It is to be understood that the present invention is not limited to the embodiments described above and illustrated in the drawings; rather, the skilled person will recognize that many changes and modifications may be made within the scope of the appended claims.

The invention claimed is:

1. A control device for controlling a vehicle speed of a vehicle, wherein the control device is configured to automatically control the vehicle speed based on a set speed and to automatically reduce the vehicle speed to a predetermined safe speed below the set speed as it is detected that the vehicle approaches a road section of a predetermined type, wherein the control device is configured to:

while automatically controlling the vehicle speed towards the predetermined safe speed as the vehicle approaches the road section of the predetermined type, receive a request from a driver of the vehicle to control the vehicle speed to a temporary vehicle speed different from the predetermined safe speed and the set speed, wherein the temporary vehicle speed is set by the driver;

in response to said request and without disabling of the control device, control the vehicle speed to the temporary vehicle speed, and at an end of the road section of the predetermined type, automatically control the vehicle speed based on the set speed, wherein the predetermined type of road section is a curve, wherein the control device is configured to identify, during deceleration of the vehicle speed, at least a first type of request from the driver and in response thereto set the temporary vehicle speed to a current vehicle speed of the vehicle at a time of receiving the first type of request, and wherein the temporary vehicle speed is higher than the predetermined safe speed.

2. The control device according to claim 1, wherein the control device is further configured to identify a second type of request from the driver and in response thereto reduce the vehicle speed below the predetermined safe speed.

3. The control device according to claim 2, wherein the control device is configured to reduce the vehicle speed until a predetermined end condition is fulfilled.

4. The control device according to claim 2, wherein the control device is configured to identify the request from the driver as the second type of request when said request is generated by actuating a brake pedal of the vehicle.

5. The control device according to claim 3, wherein said predetermined end condition is considered to be fulfilled when the first type of request is received, or when it is determined that the vehicle has reached the end of the road section of the predetermined type.

6. The control device according to claim 1, wherein the control device is configured to identify the request from the driver as the first type of request when said request is generated by actuating an accelerator pedal of the vehicle.

7. The control device according to claim 1, wherein the control device is configured to store data relating to the request from the driver.

8. The control device according to claim 7, wherein the control device is configured to use the stored data for adaptation of the predetermined safe speed of the vehicle.

9. The control device according to claim 7, wherein the control device is further configured to:
- detect that the vehicle approaches a previously travelled road section of the predetermined type for which data relating to at least one request from the driver has been stored, and
- in response to said detection, automatically control the vehicle speed to a stored temporary vehicle speed.

10. A vehicle comprising a control device according to claim 1.

11. A method for controlling a vehicle speed of a vehicle having an automatic cruise control system configured to automatically control the vehicle speed based on a set speed and to automatically reduce the vehicle speed to a predetermined safe speed below the set speed as it is detected that the vehicle approaches a road section of a predetermined type, wherein the method comprises:
- while automatically controlling the vehicle speed towards the predetermined safe speed as the vehicle approaches the road section of the predetermined type, receiving a request from a driver of the vehicle to control the vehicle speed to a temporary vehicle speed different from the predetermined safe speed and the set speed, wherein the temporary vehicle speed is set by the driver,
- in response to said request and without disabling of the control device, controlling the vehicle speed to the temporary vehicle speed,
- at an end of the road section of the predetermined type, automatically controlling the vehicle speed based on the set speed, wherein the predetermined type of road section is a curve, and
- identifying, during deceleration of the vehicle speed, at least a first type of request from the driver, and in response thereto setting the temporary vehicle speed to a current vehicle speed of the vehicle at a time of receiving the first type of request,
- wherein the temporary vehicle speed is higher than the predetermined safe speed.

12. The method according to claim 11, further comprising identifying a second type of request from the driver and in response thereto reducing the vehicle speed below the predetermined safe speed.

13. The method according to claim 12, further comprising reducing the vehicle speed until a predetermined end condition is fulfilled.

14. The method according to claim 12, comprising identifying the request from the driver as the second type of request when said request is generated by actuating a brake pedal of the vehicle.

15. The method according to claim 13, wherein said predetermined end condition is considered to be fulfilled when the first type of request is received, or when it is determined that the vehicle has reached the end of the road section of the predetermined type.

16. The method according to claim 11, comprising identifying the request from the driver as the first type of request when said request is generated by actuating an accelerator pedal of the vehicle.

17. The method according to claim 11, further comprising:
- storing data relating to said request from the driver.

18. The method according to claim 17, further comprising:
- using the stored data for adaptation of the predetermined safe speed of the vehicle.

19. The method according to claim 17, further comprising:
- detecting that the vehicle approaches a previously travelled road section of the predetermined type for which data relating to at least one request from the driver has been stored,
- in response to said detection, automatically controlling the vehicle speed to a stored temporary vehicle speed.

20. A non-transitory computer readable medium carrying a computer program comprising program code for performing the steps of claim 11 when said computer program is run on a computer.

* * * * *